United States Patent [19]

Vance

[11] Patent Number: 4,643,537

[45] Date of Patent: Feb. 17, 1987

[54] OPTICAL FILTER

[75] Inventor: Jeffrey D. Vance, Barberton, Ohio

[73] Assignee: PPG Industries, Inc., Pittsburgh, Pa.

[21] Appl. No.: 617,424

[22] Filed: Jun. 5, 1984

[51] Int. Cl.[4] ............................ C03C 4/08; G02B 1/10; G02C 7/10

[52] U.S. Cl. .................................. 350/438; 252/582; 350/311

[58] Field of Search ................ 350/438, 311, 1.1, 164, 350/165; 252/582

[56] References Cited

U.S. PATENT DOCUMENTS

| | | |
|---|---|---|
| 1,886,237 | 11/1932 | Rogers et al. . |
| 1,969,735 | 8/1934 | Ellis et al. . |
| 2,370,567 | 2/1945 | Muskrat et al. . |
| 2,403,113 | 7/1946 | Muskrat et al. . |
| 3,106,438 | 10/1963 | Converse et al. ............... 8/39 |
| 4,139,578 | 2/1979 | Baughman et al. . |
| 4,346,197 | 8/1982 | Crano et al. . |
| 4,360,460 | 11/1982 | Hurter . |

FOREIGN PATENT DOCUMENTS 1407228 9/1975 United Kingdom .

OTHER PUBLICATIONS

F. Ullmann et al., "Uber 1-Oxy-4-Chlor-Anthrachinon", Chem. Ber. 53, 826-837, 835 (1920).
The Chemistry of Synthetic Dyes, vol. V, by K. Venkataraman, Ed., Part II, Acid Anthraquinone Dyes, p. 122, W. Schoenauer et al., Academic Press, Inc. (1971).
CA, vol. 79, 1973, 147420b, Anthraquinone Dyes.

Primary Examiner—John K. Corbin
Assistant Examiner—Rebecca D. Gass
Attorney, Agent, or Firm—Irwin M. Stein

[57] ABSTRACT

Polyol(allyl carbonate) monomer, e.g., diethylene glycol bis(allyl carbonate), containing 1-[(2,6-dibromo-4-methylphenyl)amino]-4-hydroxy-9,10-anthracenedione in amounts sufficient to selectively absorb at least 90 percent of the visible and ultraviolet light segments of the electromagnetic spectrum below 550 nanometers is described. Also described are ophthalmic articles prepared by curing the monomer.

22 Claims, 2 Drawing Figures

OPTICAL FILTER

DESCRIPTION OF THE INVENTION

Ophthalmic lenses typically transmit high levels of ultraviolet radiation. Recently, concern has been expressed that ultraviolet radiation may be potentially harmful to the eye. In addition, there are many individuals who are particularly sensitive to radiation in the lower portion of the visible spectrum, e.g., between about 400 and 550 nanometers, as a result of ocular conditions such as cataracts.

The use of chemical additives as internal filters for ophthalmic plastic lenses poses several difficulties. Firstly, the chemical additive must be soluble in the organic monomer used to produce the solid plastic lens. Secondly, since polymerization of the organic monomer is initiated by free-radical initiators, e.g., peroxide initiators, the additive must be resistant to oxidation caused by the peroxide initiator during polymerization. Thirdly, the additive must also be resistant to thermal degradation brought about by the elevated temperatures used during polymerization. Finally, the chemical additive must not adversely affect the polymerization process, in a significant way, i.e., severely inhibit the cure or castability of the monomer, or adversely affect the physical properties, e.g., the hardness, refractive index, clarity, etc. of the polymerizate.

There has, therefore, been a continuing search for organic chemical additives that are soluble in the organic monomer used to produce the plastic ophthalmic article, are stable to peroxide initiators and thermal degradation, do not adversely affect the physical properties of the cured plastic article and which impart to the cured plastic article the property of selectively absorbing ultraviolet light and visible light in the lower portion of the visible region of the electromagnetic spectrum, e.g., up to about 530 or 550 nanometers.

It has now been discovered that polymerizates of polyol(allyl carbonate) monomers that contain an effective amount of 1-[(2,6-dibromo-4-methylphenyl)amino]-4-hydroxy-9,10-anthracenedione selectively absorb at least 90 percent of the ultraviolet and visible light segments of the electromagnetic spectrum below the wavelength of 550 nanometers. More particularly, it has been discovered that polymerizates of [polyol(allyl carbonate)], e.g., diethylene glycol bis(allyl carbonate), that contain from above 0.15 to about 0.40 weight percent of the aforesaid anthraecenedione selectively absorb a substantial portion, e.g., 94–95 percent, of the electromagnetic spectrum through 550 nanometers, which includes the potentially harmful ultraviolet light portion of the electromagnetic spectrum and the lower portion of the visible light spectrum, e.g., the blue segment, which are believed to be the primary causes of discomfort for individuals with ocular conditions, such as that previously described.

BRIEF DESCRIPTION OF THE DRAWINGS

The present invention will be more fully understood by reference to the attached drawings wherein.

DETAILED DESCRIPTION OF THE INVENTION

Figure 1:
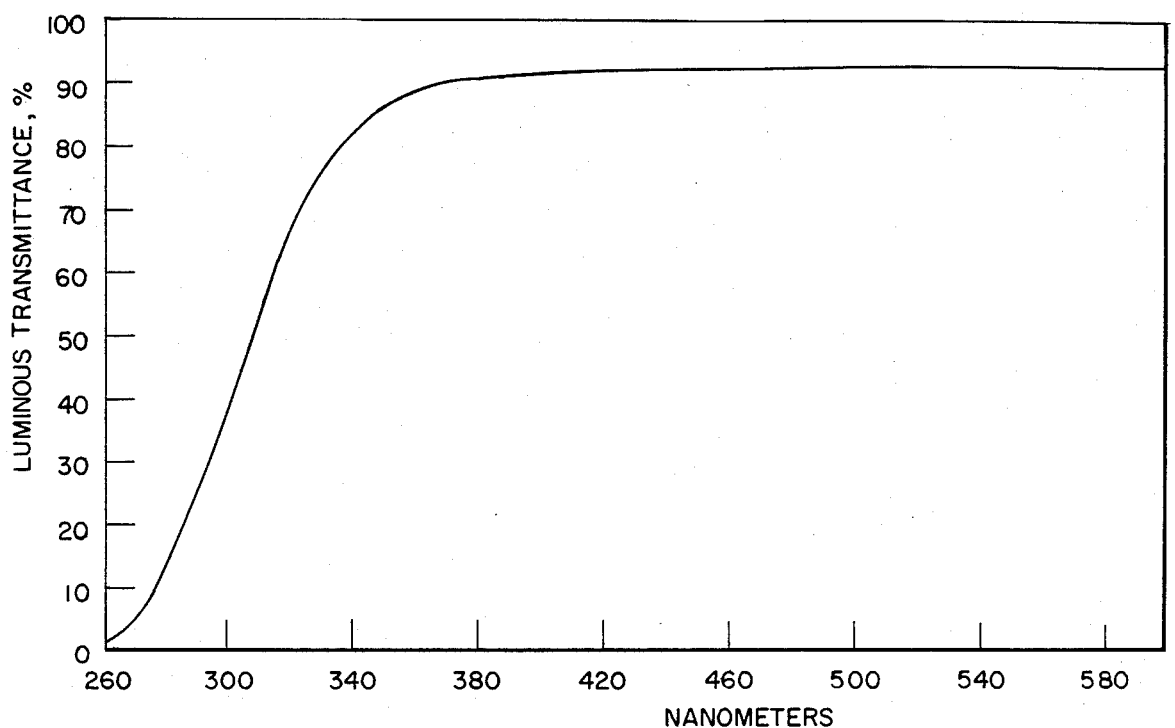
FIG. 1 is a plot of the percent light transmittance against wavelength for the electromagnetic spectrum from about 260 to 600 nanometers for poly[diethylene glycol bis(allyl carbonate)] containing no organic light filtering additive.

In accordance with the present invention, there is provided an optical filter prepared from polymerizates of [polyol(allyl carbonate)] that is capable of selectively absorbing at least 90 percent of the ultraviolet and visible light segments of the electromagnetic spectrum below the wavelength of 550 nanometers. The aforesaid optical filter is obtained by dissolving in the liquid polyol(allyl carbonate) monomer an effective amount of 1-[(dibromo-4-methyl-phenyl)amino]-4-hydroxy-9,10-anthracenedione additive and polymerizing the resulting solution. In particular, the additive is the 2,6-dibromo isomer.

The aforesaid anthracenedione additive (2,6-dibromo isomer) can be illustrated by the graphic formula,

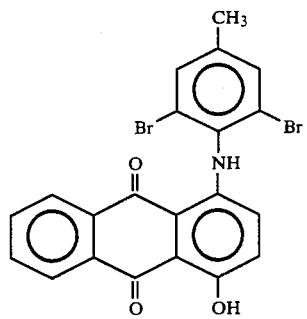

It can also be named N-(2,6-dibromo-4-methylphenyl)-1-hydroxy-4-aminoanthraquinone, or anthraquinone-1-hydroxy-4-(2,6-dibromo-p-toluidino).

The above-described anthracenedione additive may be prepared by condensation of 1-hydroxy-4-chloroanthraquinone with 2,6-dibromo-para-toluidine in the presence of alkali using the techniques described by F. Ullmann et al, *Chem. Ber.* Vol. 53, p. 835 (1920). 1-hydroxy-4-chloroanthraquinone may be prepared by condensation of phthalic anhydride with p-chlorophenol in the presence of anhydrous aluminum chloride. Alternatively, 2,6-dibromo-para-toluidine can be condensed with quinizarin in aqueous alcohol in the presence of boric acid. Moreover, it is postulated that 1-[(4-methylphenyl)amino]-4-hydroxy-9,10-anthracenedione (prepared by the aforesaid condensation reactions using p-toluidine as a reactant) can be brominated directly to produce the 2,6-dibromo derivative using mild bromination conditions. Bromination to produce the 2,4,6-tribromo derivative is described in U.S. Pat. No. 3,106,438.

It is also contemplated that dibromo isomers of the anthracenedione additive described above may be used in the present invention. For example, the 2,5-dibromo, 3,5-dibromo, and 3,6-dibromo isomers, as well as mixtures of such isomers with or without the 2,6-dibromo isomer may be used. This is particularly the case when direct bromination preparative techniques are used. The aforesaid isomers may also be prepared by substituting the corresponding dibromo-p-toluidine reactant for the described 2,6-dibromo reactant.

The amount of the above-described anthracenedione additive added to the polymerizable polyol(allyl carbonate) liquid monomer is an effective amount, i.e., an amount such that the resulting polymerizate will absorb at least 90 percent of the ultraviolet and visible light spectrum through 550 nanometers. Typically, from above 0.15 to about 0.40 weight percent of the anthracenedione additive will be sufficient to provide the above-described light filtering characteristic. More typically from about 0.20 to about 0.30 weight percent of the anthracenedione additive is used. When used in the aforesaid typical amounts, at least 90, preferably at least 95, percent of ultraviolet and visible light through 550 nanometers are selectively absorbed by a 2.2 millimeter thick polymerizate.

The exact amount of the anthracenedione additive required to provide a polymerizate that absorbs a prescribed level of the ultraviolet and visible light spectrum through 550 nanometers, e.g., 95 percent, will depend on the thickness of the polymerizate. The thicker the polymerizate, the less anthracenedione additive required to obtain the desired level of light absorption and vice versa. Thus, the concentration of anthracenedione additive can be varied within the aforedescribed range so as to obtain a particular level of light absorption within the range of 90-100 percent for light less than 550 nanometers for a polymerizate of a particular thickness.

Polyol(allyl carbonate) monomers which may be utilized in the practice of the present invention are the allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113. In the latter patent, the monomers are prepared by treating the polyol, e.g., glycol, with phosgene at temperatures between 0° C. and 20° C. to form the corresponding polychloroformate, e.g., dichloroformate. The polychloroformate is then reacted with an unsaturated alcohol in the presence of a suitable acid acceptor, e.g., pyridine, a tertiary amine, or an alkali or alkaline earth metal hydroxide. Alternatively, the unsaturated alcohol can be reacted with phosgene and the resulting chloroformate reacted with the polyol in the presence of an alkaline reagent, as described in U.S. Pat. No. 2,370,567.

The polyol(allyl carbonate) monomers can be represented by the graphic formula:

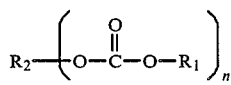

wherein $R_1$ is the radical derived from the unsaturated alcohol and is an allyl or substituted allyl group, $R_2$ is the radical derived from the polyol and n is a whole number from 2 to 5, preferably 2. The allyl group ($R_1$) can be substituted at the 2 position with a halogen, most notably chlorine or bromine, or an alkyl group containing from 1 to 4 carbon atoms, generally a methyl or ethyl group. The $R_1$ radical can be represented by the graphic formula:

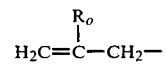

wherein $R_o$ is hydrogen, halogen, or a $C_1$-$C_4$ alkyl group. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_1$ is the allyl group, $H_2C=CH-CH_2-$.

$R_2$ is a polyvalent radical derived from the polyol, which can be an aliphatic or aromatic polyol that contains 2, 3, 4, or 5 hydroxy groups. Typically, the polyol contains 2 hydroxy groups, i.e., a glycol or a bisphenol. The aliphatic polyol can be linear or branched and contain from 2 to 10 carbon atoms. Commonly, the aliphatic polyol is an alkylene glycol having from 2 to 4 carbon atoms or a poly($C_2$-$C_4$)alkylene glycol, i.e., ethylene glycol, propylene glycol, trimethylene glycol, tetramethylene glycol, or diethylene glycol, triethylene glycol, etc.

The aromatic polyol can be represented by the graphic formula:

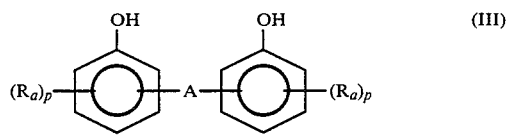

wherein A is a divalent alkyl radical, e.g., an alkylidene radical, having from 1 to 4 carbon atoms, e.g., methylene, ethylidene, dimethylmethylene(isopropylidene), Ra represents lower alkyl substituents of from 1 to 3 carbon atoms, and p is 0, 1, 2, or 3. Preferably, the hydroxyl group is in the ortho or para position.

Specific examples of the radical $R_2$ include: alkylene groups containing from 2 to 10 carbon atoms such as ethylene, ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$; alkylene polyether groups such as $-CH_2CH_2-O-CH_2CH_2-O-CH_2CH_2-$ and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2CH_2-$; and isopropylidene bis(paraphenyl), i.e.,

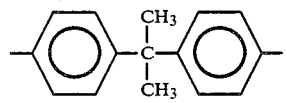

Most commonly, $R_2$ is $-CH_2CH_2-$, $-CH_2CH_2-O-CH_2CH_2-$; or $-CH_2CH_2-O-CH_2CH_2-$.

Preferred are the bis(allyl carbonate) monomers which can be represented by the graphic formula:

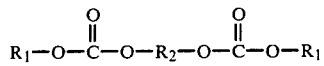

wherein $R_1$ and $R_2$ are as defined above.

Specific examples of polyol(allyl carbonate) monomers useful in the practice of the invention herein contemplated include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2ethylallyl carbonate), pentamethylene glycol bis(allyl carbonate), and isopropylidene bisphenol bis(allyl carbonate).

Industrially important polyol bis(allyl carbonate) monomers which can be utilized in the invention herein contemplated are:

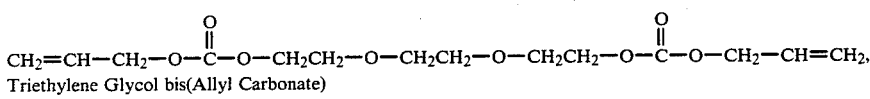
Triethylene Glycol bis(Allyl Carbonate)

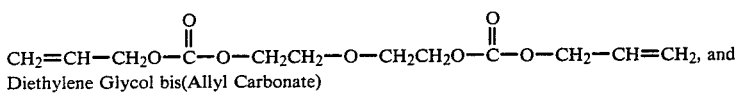
Diethylene Glycol bis(Allyl Carbonate)

Ethylene Glycol bis(Allyl Carbonate)

Diethylene glycol bis(allyl carbonate) is preferred. This monomer is commercially available from PPG Industries, Inc. and is sold under the trademark CR-39 Allyl Diglycol Carbonate.

Because of the process by which the polyol(allyl carbonate) monomer is prepared, i.e., by phosgenation of the polyol (or allyl alcohol) and subsequent esterification by the allyl alcohol (or polyol), the monomer product can contain related monomer species in which the moiety connecting the allyl carbonate groups contains one or more carbonate groups. When the polyol is a diol, these related monomer species can be represented by the graphic formula:

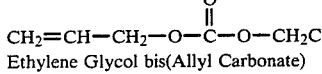

wherein $R_1$ is as defined above with respect to graphic formula I, $R_3$ is a divalent radical, e.g., alkylene or phenylene, derived from the diol, and s is a whole number from 2 to 5. The related monomer species of diethylene glycol bis(allyl carbonate) can be represented by the graphic formula,

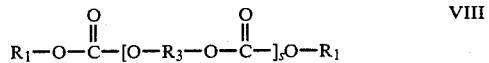

wherein s is a whole number from 2 to 5. The polyol(allyl carbonate) monomer can typically contain from 2 to 20 weight percent of the related monomer species and such related monomer species can be present as mixtures, i.e., mixtures of the species represented by s being equal to 2, 3, 4 etc.

In addition, a partially polymerized form of the polyol(allyl carbonate) monomer can be used. In that embodiment, the monomer is partially polymerized by using small, e.g., 0.5-1.5 phm, amounts of initiator or thickened by heating to provide a non-gel containing, more viscous monomeric material.

As used in the present description and claims, the term polyol(allyl carbonate) monomer or like names, e.g., diethylene glycol bis(allyl carbonate), are intended to mean and include the named monomer or prepolymer and any related monomer species contained therein.

Other copolymerizable monomeric materials may also be present with the polyol(allyl carbonate) monomer. For example, a viscosity increasing monomeric material may be dispersed in the monomer, as described in U.S. Pat. No. 4,346,197. Other materials such as allyl S-triazines and urethanes having acrylate functionality, as described in U.S. Pat. No. 4,360,653, may be present in the monomer to modify the ultimate physical and thermal properties of the polymer. U.S. Pat. No. 4,139,578 describes the presence of unsaturated polyester and unsaturated copolymerizable monomer to decrease the shrinkage that occurs during polymerization of polyol(allyl carbonate) monomers. Hence, as herein contemplated, the polyol(allyl carbonate) monomer to be polymerized may also contain minor, e.g., less than 50 weight percent, of other copolymerizable materials which are used to modify the ultimate properties or processing characteristics of the polyol(allyl carbonate) monomer.

The polymerizable polyol(allyl carbonate) monomer containing the anthracenedione additive can be prepared by admixing the two materials in a suitable vessel at room temperature. The rate of dissolution of the anthracenedione can be increased by heating the polymerizable monomer slightly, e.g., up to 60° or 70° C. Alternatively, the anthracenedione can be dissolved in the monomer up to its solubility limit to thereby form a concentrate which can then be diluted with the polyol(allyl carbonate) monomer to provide a polymerizable mixture containing the desired amount of anthracenedione additive. For example, a 0.30 percent concentrate of the anthracenedione additive in diethylene glycol bis(allyl carbonate) monomer can be prepared by heating a mixture of the appropriate amounts of the anthracenedione and monomer to 75° C. with agitation. Cast-

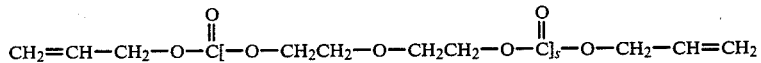

ing solutions containing less than 0.30 weight percent of the anthracenedione can then be prepared by blending appropriate diluting amounts of the monomer with the hot concentrate or a portion thereof.

Polymerization of the anthracenedione—containing polyol(allyl carbonate) polymerizable monomer is effected by adding a free-radical initiator, e.g., a peroxide initiator, to the mixture and heating the mixture. Such organic peroxides are well known in the art. Preferred free-radical initiators are organic peroxy compounds, such as peroxyesters, diacyl peroxides, peroxydicarbonates and mixtures of such peroxy compounds.

Examples of such organic peroxy compounds include: peroxydicarbonate esters such as di(n-propyl)-, diisopropyl-, di(n-butyl)-, di(secondary butyl)-, diisobutyl-, di(2-ethylhexyl)-, dicetyl-, dicyclohexyl- and di(4-tertiarybutyl cyclohexyl)peroxydicarbonate; diacyl peroxides such as diacetyl-, dibenzoyl-, dilauroyl-, and diisobutyryl peroxide; and peroxyesters such as tertiarybutyl peroxypivalate, tertiarybutyl peroctoate and tertiarybutyl perneodecanoate.

The amount of peroxide initiator can vary but generally will be an initiating amount, i.e., an amount sufficient to produce a fully cured solid polymerizate utilizing the time period and temperatures of the cure cycle chosen. The amount of peroxide initiator used will typically vary from about 2.0–10.0 parts of peroxide per hundred parts of monomer. More typically, from about 3.0 to 5, e.g., 3.5, parts of peroxide per hundred parts of monomer (phm) are used.

The polyol(allyl carbonate) monomer may be polymerized in an air oven or in a water bath. The time of polymerization, or cycle, is a function of the rate at which the heat of polymerization can be removed, which depends on the thickness of the article to be produced. A complete discussion of the time-temperature relationship for cure cycles of diethylene glycol bis(allyl carbonate) can be found in the article, "Polymerization Control In Casting A Thermosetting Resin" by William R. Dial et al, Industrial and Engineering Chemistry, Volume 47, page 2447–51, December 1955.

In one exemplification of the present invention, about 0.20 weight percent of the anthracenedione is added to diethylene glycol bis(allyl carbonate) and the resulting mixture polymerized by the addition of 3.5 weight percent diisopropyl peroxydicarbonate. The resulting polymerizate has a red hue, is optically clear and haze free, and absorbs greater than 95 percent of all incident light and radiation below 550 nanometers, i.e., from 200–550 nanometers.

The present invention is more particularly described in the following examples, which are intended as illustrative only since numerous modifications and variations therein will be apparent to those skilled in the art. In the examples, polymerization products are tested for the following properties using the physical test methods hereinafter described.

1. Light transmission and haze—The percent light transmission and percent haze are measured using a Hunter lab colorimeter, Model D25P-2; and 2. Barcol hardness—This property is measured in accordance with ASTM Test Method D2583-81 using a Barcol impressor.

EXAMPLE I 1000 grams of diethylene glycol bis(allyl carbonate) and 3.00 grams of the anthracenedione, 1-[(2,6-dibromo-4-methylphenyl)amino]4-hydroxy-9,10-anthracenedione, were charged to a flask and heated with mixing to about 75° C., for about 45 minutes. The resulting solution was cooled to room temperature and filtered through 5 micron Acropor membrane filter paper. Portions of this stock solution (which was a deep red color) were diluted with various amounts of the same diethylene glycol bis(allyl carbonate) used to prepare the stock solution so as to produce other solutions containing 0.27, 0.24 and 0.21 weight percent respectively of the anthracenedione.

The diluted solutions and the stock solution were used to prepare square castings in the following manner. Diisopropyl peroxydicarbonate was added to a predetermined amount of each of the solutions to obtain a concentration of 3.50 parts of the peroxydicarbonate per 100 parts of the solution. The initiator-containing solutions were each injected into molds formed by two 4 inch×4 inch (10.2×10.2 centimeters) glass plates separated by a 2.2 millimeter ethylene vinyl acetate gasket. The molds were heated gradually in an air oven from about 44° C. to 90° C. over a period of 16.5 hours. Thereafter, the temperature of the molds was increased to 105° C. over 20 minutes and the molds maintained at that temperature for an additional 10 minutes. While still hot, the glass plates of the molds were separated to obtain the castings. Each of the resulting castings, which had a red hue, were tested for Barcol hardness, haze and light transmittance.

The casting containing 0.30 weight percent of the anthracenedion exhibited less than 5% light transmission through 580 nanometers (nm). An examination of the transmission spectra showed less than 1% transmission from 200-525 nm, 1.5% transmission at 550 nm, 4% transmission at 575 nm, 25% transmission at 600 nm, 85% transmission at 650 nm, and 90% transmission at 700 nm.

The castings containing 0.27, 0.24 and 0.21 weight percent of the anthracenedione exhibited less than 5% light transmission through 565 nm, 560 nm and 555 nm respectively. The percent light transmission at 550, 600, 650 and 700 nm, Barcol hardness, and haze for these castings and for a casting containing no additive are tabulated in Table I.

TABLE I

| Additive, Wt % | Luminous Transmittance % Wavelength, nm | | | | Ave. Visible (White Light) Transmittance, % | Barcol Hardness, 15 sec. | Haze % |
|---|---|---|---|---|---|---|---|
| | 550 | 600 | 650 | 700 | | | |
| 0.27 | 2.0 | 30 | 85 | 90 | 13.3 | 23 | N.D* |
| 0.24 | 3.0 | 34 | 86 | 90 | 14.4 | 21 | 0.1 |
| 0.21 | 4.5 | 35 | 86 | 90 | 16.1 | 23 | 0.3 |
| 0.00 | 91 | 91 | 91 | 91 | 92.6 | 26 | 0.6 |

*N.D. - Not Detectable

Figure 2:
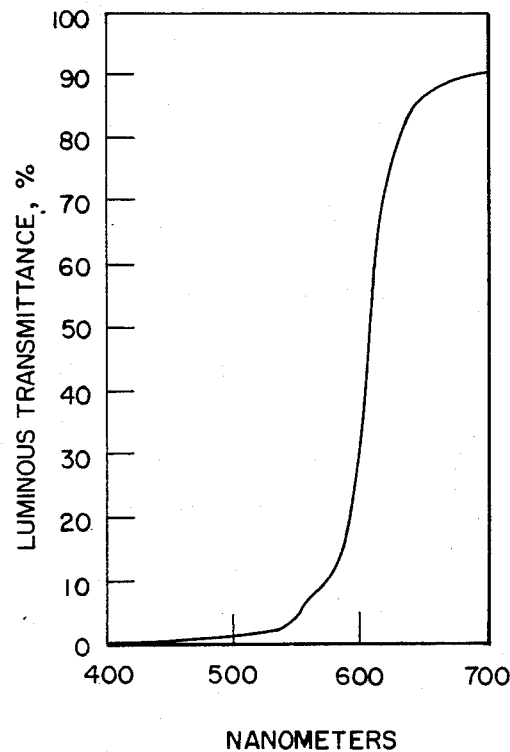
FIG. 2 is a plot of the percent light transmittance against wavelength for the electromagnetic spectrum from about 400 to 700 nanometers for poly[diethylene glycol bis(allyl carbonate)] containing about 0.21, weight percent 1-[(2,6-dibromo-4-methylphenyl)amino]-4-hydroxy-9,10-anthracenedione.

The portion of the transmission spectra from about 400 to 700 nm for the casting contained about 0.21 weight of the anthracenedione is depicted in FIG. 2. The transmission spectra over the range of 260–600 nm of a diethylene glycol bis(allyl carbonate) polymerizate containing no additive and prepared in a similar fashion is depicted in FIG. 1.

The data of this example and Table I show that the addition of low levels of 1-[(2,6-dibromo-4-methylphenyl)amino]-4-hydroxy-9,10-anthracenedione has a dramatic effect on the ultraviolet and visible transmittance of the cast polymerizate. Ultraviolet and visible radiation can be effectively absorbed through about 550 nanometers at the indicated concentration levels of the anthracenedione additive. A lens prepared from such a polymerizate would protect portions of the eye (such as the cornea, crystalline lens, or retina) from potential photochemical damage, e.g., cataracts, by absorbing near ultraviolet, blue, and some green light. Beyond about 550 nm, the polymerizate begins to transmit visible yellow, orange and red light, eventually reaching up to 90 percent transmittance at 700 nm. Further, the castings demonstrate good hardness levels and low haze levels. Finally, the castings exhibit reduced transmission of visible light which allow their use in sunscreening applications, e.g., sunglasses.

EXAMPLE II

The procedure of Example I was used to produce castings of diethylene glycol bis(allyl carbonate) containing the specified anthracenedione additive except that the stock solution was prepared using 500 grams of the bis(allyl carbonate) monomer and 1.75 grams of the dye (or 0.35 parts of additive per hundred parts of monomer (phm) and the stock solution was heated with mixing to from 60°-70° C., for about 60 minutes to dissolve the dye. A small amount of dye was found on the filter after filtration. Portions of the stock solution were diluted with the bis(allyl carbonate) monomer to produce casting solutions containing about 0.30, 0.20, 0.10 and 0.05 weight percent of the additive, basis the original concentration (0.35 phm) of the additive in the stock solution. The castings were prepared in 6 inch×6 inch×⅛ inch (15.24 cm×15.24 cm×0.32 cm) glass molds.

The castings recovered were haze free, uncracked and were of varying degrees of red color. The percent transmittance at various wavelengths are tabulated in Table II.

TABLE II

| Additive Wt % | Luminous Transmittance, % Wavelength, nm | | | | 5% Transmittance, Wavelength |
|---|---|---|---|---|---|
| | 550 | 600 | 650 | 700 | |
| 0.35 | 1.0 | 20 | 85 | 90 | 585 nm |
| 0.30 | 1.5 | 25 | 86 | 90 | 580 nm |
| 0.20 | 7.0 | 43 | 87 | 91 | 545 nm |
| 0.10 | 26 | 62 | 90 | 91 | 435 nm |
| 0.05 | 47 | 75 | 91 | 92 | 340 nm |

Articles prepared from the compositions of the present invention may be used in those applications which require filtration of light radiation of wave lengths below about 550 nanometers. In particular, polymerizates of the present invention may be used as ophthalmic lenses for individuals that are sensitive to visible light and ultraviolet energy below the wave length of 550 nanometers, or for general sunglass applications.

Although the present invention has been described with reference to specific details of certain embodiments thereof, it is not intended that such details should be regarded as limitations upon the scope of the invention except as and to the extent that they are included in the accompanying claims.

I claim:

1. A composition of liquid polyol(allyl carbonate) monomer and 1-[(dibromo-4-methylphenyl)amino]-4-hydroxy-9,10-anthracenedione said anthracenedione being present in amounts such that a polymerizate prepared from such composition selectively absorbs at least 90 percent of the visible and ultraviolet light segments of the electromagnetic spectrum below the wavelength of 550 nanometers.

2. The composition of claim 1 wherein the anthracenedione is present in amounts of from above 0.15 to about 0.40 weight percent.

3. The composition of claim 1 wherein the anthracenedione is 1-[(2,6-dibromo-4-methylphenyl)amino]-4-hydroxy-9,10-anthracenedione.

4. The composition of claim 3 wherein the liquid polyol(allyl carbonate) monomer is represented by the following graphic formula,

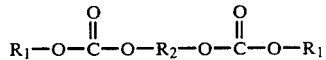

wherein $R_2$ is an alkylene glycol having from 2 to 4 carbon atoms or a poly($C_2$-$C_4$)alkylene glycol, and wherein $R_1$ is the allyl radical,

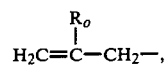

wherein $R_o$ is hydrogen, halogen or a $C_1$-$C_4$ alkyl radical.

5. The composition of claim 3 wherein the anthracenedione is present in amounts of from above 0.15 to about 0.40 weight percent.

6. The composition of claim 5 wherein the polymerizate absorbs at least 95 percent of the visible and ultraviolet light segments of the electromagnetic spectrum below the wavelength of 550 nanometers.

7. The composition of claim 1 wherein the polyol(allyl carbonate) monomer is diethylene glycol bis(allyl carbonate).

8. The composition of claim 4 wherein the anthracenedione is present in amounts of from about 0.20 to about 0.30 weight percent.

9. The composition of claim 1 wherein the liquid polyol(allyl carbonate) monomer is represented by the following graphic formula,

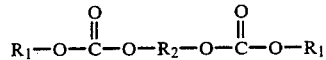

wherein $R_2$ is an alkylene glycol having from 2 to 4 carbon atoms or a poly($C_2$-$C_4$)alkylene glycol, and wherein $R_1$ is the allyl radical,

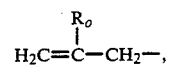

wherein $R_o$ is hydrogen, halogen or a $C_1$-$C_4$ alkyl radical.

10. The composition of claim 9 wherein the polyol(allyl carbonate) monomer is diethylene glycol bis(allyl carbonate).

11. The composition of claim 10 wherein the anthracenedione is present in amounts of from above 0.15 to about 0.30 weight percent.

12. A composition of diethylene glycol bis(allyl carbonate) and from about 0.20 to about 0.30 weight percent 1-[2,6-dibromo-4-methylphenyl)amino]-4-hydroxy-9,10-anthracenedione, said amount of anthracenedione being such that a polymerizate of said composition selectively absorbs at least 90 percent of the visible and ultraviolet light segments of the electromagnetic spectrum below the wavelength of 550 nanometers.

13. The composition of claim 12 wherein the polymerizate absorbs at least 95 percent of the visible and ultraviolet light segments of the electromagnetic spectrum below the wavelength of 550 nanometers.

14. A polymerizate of polyol(allyl carbonate), said polymerizate containing 1-[(dibromo-4-methylphenyl)amino]-4-hydroxy-9,10-anthracenedione in amounts such that it selectively absorbs at least 90 percent of the visible and ultraviolet light segments of the electromagnetic spectrum below the wavelength of 550 nanometers.

15. The polymerizate of claim 14 wherein the anthracenedione is present in amounts of from above 0.15 to about 0.40 weight percent.

16. The polymerizate of claim 15 wherein the anthracenedione is 1-[2,6-dibromo-4-methylphenyl)amino]-4-hydroxy-9,10-anthracenedione.

17. The polymerizate of claim 15 wherein the polyol(allyl carbonate) is represented by the following graphic formula,

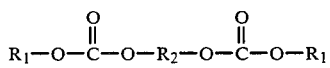

wherein $R_2$ is an alkylene glycol having from 2 to 4 carbon atoms or a poly($C_2$-$C_4$)alkylene glycol, and wherein $R_1$ is the allyl radical,

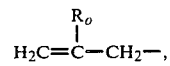

wherein $R_o$ is hydrogen, halogen or a $C_1$-$C_4$ alkyl radical.

18. The polymerizate of claim 17 wherein the anthracenedione is 1-[(2,6-dibromo-4-methylphenyl)amino]-4-hydroxy-9,10-anthracenedione and the percent absorption of the visible and ultraviolet light segments of the electromagnetic spectrum below the wavelength of 550 nanometers is at least 95 percent.

19. The polymerizate of claim 17 wherein the polyol(allyl carbonate) is diethylene glycol bis(allyl carbonate).

20. The polymerizate of claim 19 wherein the anthracenedione is 1-[(2,6-dibromo-4-methylphenyl)amino]-4-hydroxy-9,10-anthracenedione.

21. An ophthalmic article of poly[diethylene glycol bis(allyl carbonate)] and from above 0.15 to about 0.40 weight percent 1-[2,6-dibromo-4-methylphenyl)amino]-4-hydroxy-9,10-anthracenedione, said anthracenedione being present in amounts such that the article selectively absorbs at least 95 percent of the visible and ultraviolet light segments of the electromagnetic spectrum below the wavelength of 550 nanometers.

22. The article of claim 17 wherein the article is an ophthalmic lens.